(12) United States Patent
Otterspeer et al.

(10) Patent No.: US 9,031,726 B2
(45) Date of Patent: May 12, 2015

(54) METHOD AND DEVICE TO PROVIDE ADAPTIVE OIL PRIMING FUNCTIONALITY

(71) Applicant: Volvo Car Corporation, Gothenburg (SE)

(72) Inventors: Rob J. Otterspeer, Torslanda (SE); Ingvar Akesson, Gothenburg (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 14/180,565

(22) Filed: Feb. 14, 2014

(65) Prior Publication Data
US 2014/0236408 A1 Aug. 21, 2014

(30) Foreign Application Priority Data

Feb. 18, 2013 (EP) .................................... 13155601

(51) Int. Cl.
| | |
|---|---|
| *B60L 9/00* | (2006.01) |
| *G05D 1/00* | (2006.01) |
| *G06F 7/00* | (2006.01) |
| *B60W 20/00* | (2006.01) |
| *B60W 10/06* | (2006.01) |
| *B60K 6/48* | (2007.10) |
| *B60W 30/192* | (2012.01) |
| *B60W 50/00* | (2006.01) |

(52) U.S. Cl.
CPC ............ *B60W 20/108* (2013.01); *B60W 20/102* (2013.01); *B60K 6/48* (2013.01); *B60W 10/06* (2013.01); *B60W 30/192* (2013.01); *B60W 2050/0089* (2013.01); *B60W 2520/10* (2013.01); *B60W 2540/10* (2013.01); *B60W 2540/28* (2013.01); *B60W 20/00* (2013.01); *Y10S 903/905* (2013.01); *Y02T 10/6221* (2013.01)

(58) Field of Classification Search
CPC . B60W 20/00; B60W 20/108; B60W 20/102; B60W 10/06; B60W 30/192; B60W 2050/0089; B60W 2520/10; B60W 2540/10; B60W 2540/28; B60K 6/48; Y10S 903/905
USPC ................... 701/22, 424; 180/65.28; 903/905
See application file for complete search history.

(56) References Cited

U.S. PATENT DOCUMENTS

| | | | |
|---|---|---|---|
| 5,195,476 A | * | 3/1993 | Schwarz ..................... 123/179.5 |
| 6,524,217 B1 | * | 2/2003 | Murakami et al. ................ 477/5 |

(Continued)

FOREIGN PATENT DOCUMENTS

WO 2012054025 A1 4/2012

OTHER PUBLICATIONS

Extended European Search Report Dated Jun. 24, 2013, Application No. 13155601.1-1752, Applicant Volvo Car Corporation, 6 Pages.

*Primary Examiner* — Khoi Tran
*Assistant Examiner* — Abby Lin
(74) *Attorney, Agent, or Firm* — Brooks Kushman P.C.

(57) ABSTRACT

A method and a device are provided for operating a pre-lubrication system for an internal combustion engine of a hybrid electrical vehicle after vehicle start up, wherein the hybrid electrical vehicle also comprises. The electric engine is turned on at vehicle start up and the internal combustion engine is turned on at vehicle start up or after a period of time after vehicle start up. The pre-lubrication system comprises an engine control function for controlling the internal combustion engine, monitoring the torque requested by a driver and storing information regarding when the driver requests torque equal to or higher than a predetermined torque threshold. The cranking operation of the internal combustion engine, in order to build up oil pressure and fill the oil circuit with oil, is initiated based on the stored information or when the electrical hybrid vehicle reaches a predetermined vehicle speed threshold.

20 Claims, 3 Drawing Sheets

(56) References Cited

U.S. PATENT DOCUMENTS

| | | |
|---|---|---|
| 2004/0050598 A1* | 3/2004 | Saito et al. .................. 180/65.2 |
| 2004/0108149 A1 | 6/2004 | Adachi et al. |
| 2005/0274553 A1 | 12/2005 | Salman et al. |
| 2008/0305923 A1 | 12/2008 | Tabata et al. |
| 2009/0066495 A1* | 3/2009 | Newhouse et al. ........... 340/439 |
| 2009/0327821 A1* | 12/2009 | Bauerle et al. ................ 714/704 |
| 2011/0213521 A1 | 9/2011 | Ito et al. |
| 2013/0166125 A1* | 6/2013 | Yamamoto et al. ............. 701/22 |
| 2014/0324263 A1* | 10/2014 | Tabata et al. .................... 701/22 |

* cited by examiner

METHOD AND DEVICE TO PROVIDE ADAPTIVE OIL PRIMING FUNCTIONALITY

CROSS-REFERENCE TO RELATED APPLICATIONS

This application claims foreign priority benefits under 35 U.S.C. §119(a)-(d) to European patent application number EP 13155601.1, filed Feb. 18, 2013, which is incorporated by reference in its entirety.

TECHNICAL FIELD

This disclosure relates generally to the field of methods and devices associated with Hybrid Electrical Vehicles, HEV, and more particularly with methods and devices associated with starting up hybrid electrical vehicles and differences between hybrid electrical vehicles, with both an electric engine, EE, and an Internal Combustion Engine, ICE, and conventional vehicles with only ICE.

BACKGROUND

During the last decades environmental aspects such as reduction of fossil fuel consumption, reduction of exhaust emissions, increased energy efficiency etc. have been the main focus for the automotive industry. This is partly because of new, tougher legislation and industry commitments, but also due to an increasing demand and growing interest from the market. Except for optimization and development of the conventional combustion engine and the powertrain in regards of minimized friction, higher efficiency, more intelligent control systems, optimized combustion, optimized fuels, better aftertreatment systems etc., one of the most promising approaches in order to meet these prerequisites is increased electrification of the powertrain.

As of today, there are still some technological advances to be done in order to replace conventional vehicles with ICEs with electrical vehicles, e.g., the fully electrified vehicles of today generally have limited range capabilities and generally need substantial time to recharge their batteries. The predominating, partly electrified vehicles of today are HEVs, combining the conventional ICE with an EE, wherein the ICE may be partly or completely disabled during certain driving conditions. Disabling the ICE reduces the fuel consumption, but generally HEVs also need smaller ICEs, reducing the fuel consumption even more.

There are numerous configurations of HEVs, but conceptually they can generally be divided into two categories; serial hybrids and parallel hybrids. Serial hybrids generally have a generator connected to the ICE, and the generator provides energy to the EE, wherein the EE is used to drive the vehicle. In parallel hybrid vehicles both the ICE and the EE can drive the vehicle, but also combinations of the two concepts, or other variations, are possible. Common for all hybrid concepts is that there is some kind of energy management system, EMS, controlling the propulsion and energy distribution of the vehicle.

It is well known that for conventional ICEs the main part of all engine wear is caused during the first seconds after engine start up since the oil has drained away from the bearings, cylinder walls and other wear points in the engine. During normal ICE start up, some kind of lubrication system for the ICE circulates oil under pressure through the engine block, cylinder head etc. for lubrication of moving engine parts. But not only has the oil drained away when the engine has been turned off, the oil has also been cooled down, making it more viscous, which counteracts the lubrication of the engine during engine start up. The oil pressure builds up slowly, and during this time the main part of the engine wear is caused. After a few seconds the oil pressure reaches operational level and as the engine gets warmer the oil gets warmer, which lowers the viscosity of the oil.

By utilizing some kind of pre-lubrication system before engine start up, the internal friction can be lowered and the engine wear can be minimized, which will increase the engine lifetime.

Additionally, during the first engine revolutions, when the engine is drained of oil and the oil is cold, the engine will also cause more noise than during normal engine operation.

For Plug-in Hybrid Electrical Vehicles, PHEVs, Hybrid Electrical Vehicles, HEVs, or other vehicles with some kind of hybrid propulsion, with at least one EE and at least one ICE, this will also have another effect. For PHEVs or HEVs starting the vehicle might imply only starting the EE, hence the ICE will not be ignited automatically by turning the key. By not automatically starting the ICE, or by at least postponing the ignition, it is possible to save fuel and lower the vehicle exhaust emissions, as already stated; two of the biggest drivers for automotive industry during the last decades.

For newer PHEVs and HEVs, the driver generally has a lot of options regarding how the driver prefers the vehicle to function, regarding for example engine response and fuel consumption. If the ICE should be started when starting the vehicle might be up to the driver to decide by using different drive modes, where drive modes such as e.g., "eco", "city", "hybrid" or such might imply initially only starting the EE, thus enabling a more environmentally and low fuel consumption mode, and modes like e.g., "power", "force", "highway" or such might imply initially starting only the ICE, or both the ICE and EE, for better engine performance.

If the ICE is not ignited when starting the vehicle, the ICE might first be ignited during speed when the driver makes a torque demand where the EE can no longer supply sufficient power. For almost all hybrid vehicles today with both an EE and an ICE the ICE can deliver higher torque than the EE. Starting the ICE when the vehicle is already travelling at speed, the crankshaft of the ICE, and other moving parts, will initially revolve faster than if starting from standstill, which makes rapid lubrication of the moving parts of the ICE even more important.

SUMMARY

A primary object of the present disclosure is to provide a method for operating a hybrid vehicle that will overcome the shortcomings of the prior art devices, and additionally utilize the specific features of hybrid vehicles for improved driving comfort and engine functionality. The present disclosure solves these problems in prior art by pressurizing the oil system of an ICE before a driver requests torque equal to or higher than a predetermined torque threshold, wherein the predetermined torque threshold preferably is the maximum torque that the EE can deliver, entitled the EE torque threshold, or lower than the EE torque threshold.

This object is achieved by a method, according to the present disclosure, for operating a pre-lubrication system for an ICE of a HEV after vehicle start up is provided. The ICE requires lubrication, wherein the pre-lubrication system amongst others comprises at least one oil pump, an oil circuit, at least one oil sump, necessary oil conduits, means for controlling the function of the system, etc. The lubrication of the ICE is achieved by using the oil pump to build up oil pressure in the oil circuit of the ICE, wherein the oil pump typically is driven by the ICE, even if also other arrangements are possible, all according to general knowledge. During lubrication, oil is circulated from the engine oil sump through the moving components of the ICE, and is thereafter drained back to the sump. The pre-lubrication is performed in order to secure that building up oil pressure and providing all moving components of the engine with oil is completed before actual work is required from the ICE. The advantage with this is that this approach minimizes engine wear. By using the pre-lubrication system according to the present disclosure, the ICE can also give faster response since no lubrication of the ICE needs to be executed when the driver requests torque which requires torque delivery from the ICE. The method can also be used for other types of vehicles with hybrid functionality.

The oil pump may also be driven by an electric engine wherein the generator providing energy to the electric engine is coupled to the engine, a battery, etc.

As previously disclosed, a HEV according to the inventive concept comprises at least an EE and at least an ICE, wherein the EE is turned on at vehicle start up and the ICE is turned on at vehicle start up or after a period of time after vehicle start up at least when the driver requests, or is presumed to request, torque equal to or higher than the predetermined torque threshold. After the ICE is started the ICE is used together with the EE or instead of the EE. Vehicle start up indicates in this context that the car key is turned, or corresponding action is performed, turning on all electric equipment in the vehicle and putting the vehicle in a mode where the driver will get immediate engine, EE and/or ICE, response if requested.

Generally, the ICE is able to deliver higher torque than the EE. Consequently, when the driver requests torque higher than a EE torque threshold, wherein the EE torque threshold is the maximum torque delivered by the EE, the ICE has to be used together with the EE or instead of the EE in order to deliver the torque requested by the driver. The period of time after which the ICE is ignited is dependent on that some predetermined prerequisite is fulfilled such as that the vehicle reaches a predetermined vehicle speed threshold, determined by that the driver is presumed to request torque equal to or higher than the predetermined torque threshold or determined by that the driver actually requests torque higher than the predetermined torque threshold.

Further on, the pre-lubrication system comprises an engine control function for controlling the ICE, monitoring the torque requested by a driver and storing information regarding when the driver requests torque equal to or higher than the predetermined torque threshold as torque/time information data set. If it is preferred that the ICE is engaged before the EE reaches its maximum level of when torque can be delivered, the EE torque threshold, the predetermined torque threshold should be set lower than the EE torque threshold, the maximum torque delivered by the EE.

Consequently, the torque/time information data set includes information regarding all previous vehicle start ups, including all times any driver of the vehicle have requested torque equal to or higher than the predetermined torque threshold, and at what time, in relation to the timing for vehicle start up, this request was made. The engine control function is part of the EMS of the hybrid vehicle.

The method used by the engine control function comprises the following operations, controlled and initiated by the engine control function:
  after vehicle start up and EE start up, controlling the stored torque/time information data set,
  based on selected data from the stored torque/time information data set, estimating when the driver will request the predetermined torque threshold, being an estimated time of ICE torque delivery,
  based on the estimated time of ICE torque delivery initiating a cranking operation of the engine in order to build up oil pressure in the ICE and filling an engine oil circuit with oil, wherein
  the cranking operation in order build up oil pressure in the ICE and filling an engine oil circuit with oil is initiated and completed before the estimated time of ICE torque delivery, and
  monitoring of when the driver requests at least the predetermined torque threshold, being an actual time of ICE torque delivery, and storing the actual time of ICE torque delivery together with the torque/time information data set.

Utilizing the method according to the present disclosure gives the advantage of that the pre-lubrication of the ICE most likely will be executed before the driver actually requests torque equal to or higher than the predetermined torque threshold.

According to one advantageous example of the method, the predetermined torque threshold is set to be the maximum torque delivered by the EE, the EE torque threshold. Utilizing this example of the method gives the advantage of that the pre-lubrication of the ICE most likely will be executed before the driver actually requests torque higher than the EE torque threshold.

According to another advantageous example of the method, the predetermined threshold torque is equal to, or lower than, the maximum torque delivered by the EE. Utilizing this example of the method gives the advantage of that the pre-lubrication of the ICE most likely will be executed with a margin before the driver actually requests torque higher than the EE torque threshold, or predetermined torque threshold, and enables that the EE will not be used up to its torque delivery limit.

After vehicle start up new information regarding if and when the predetermined torque threshold, or above, was requested will be added to existing torque/time information data set, which will constitute the torque/time information data set for next vehicle start up. Consequently, the time/torque information data set will be updated continuously for every vehicle start up.

The used data from the torque/time information data set for estimating when the driver will request at least the predetermined torque threshold, being the estimated ICE torque delivery, can be chosen based on many different criteria. The used data can be chosen to include data from the last 10, 50, 100 or any other number of vehicle start ups, it can be chosen to include just the start ups within a predetermined time period such as for example the last month or last six months, or can be any suitable type of mean value, median value or other kind of value.

The data used, from the torque/time information data set, should be the data giving the most accurate estimation regarding; when the driver will request the predetermined torque, the estimated time of ICE torque delivery, and may also be something that changes over time. It is possible that the method used to select data for calculating the estimated time of ICE torque delivery is something that for example can be configured at regular vehicle services.

The cranking operation of the ICE, meaning the rotational movement of the crankshaft causing the movement of the pistons, driving the build up of the oil pressure and circulation of oil in the oil circuit of the engine, preferably by driving the oil pump, is initiated according to the estimated time of ICE torque delivery. The cranking operation, hence the lubrication of the ICE, is controlled by the engine control function and is initiated in accordance to be completed before the estimated time of ICE torque delivery. This is done in order to secure that the engine is already lubricated when torque equal to or exceeding the predetermined torque threshold is requested. Consequently, the ICE is lubricated before it is requested to deliver torque. This is a great advantage with the inventive concept.

The engine control function monitors when the driver actually requests torque equal to or higher than the predetermined torque threshold, being the actual time of ICE torque delivery, and stores the time at which this occurred in relation to vehicle start up, or any other suitable timing, together with previously stored torque/time information data set to create a new torque/time information data set. This torque/time information data set will afterwards be used to calculate estimated time of ICE torque delivery for next vehicle start up.

The torque/time information data set is updated after each vehicle start up, since new data continuously is added to existing data. Consequently, depending on what criteria that is used when selecting the data used for estimating the estimated time of ICE torque delivery, the timing of the initiation of the cranking operation, which is completed before estimated time of ICE torque delivery, will be updated continuously.

The method as described has the advantage that the lubrication operation of the ICE will be completed, by initiation and completion of the cranking operation, before torque equal to or exceeding the predetermined torque threshold, which might be equal to the EE torque threshold, is requested. This only applies as long as the actual ICE torque delivery request does not occur before the lubrication operation is completed. However, this has the advantage that this facilitates that the wear of the ICE is minimized.

If however, torque higher than the predetermined torque threshold, which might be equal to the EE torque threshold, is requested before the lubrication operation is initiated and completed, the cranking operation is immediately initiated according to normal engine operation.

With the method for operating a pre-lubrication system for an ICE of a HEV after vehicle start up, the lubrication can be initiated after a longer period of time after vehicle start up. The later the lubrication of the ICE is executed, hence the cranking of the ICE in order to build up oil pressure, the less disturbing will be the noise associated with the cranking operation be for a driver, since road noise, etc., will mask the noise associated with the cranking. Consequently, it is desirable to postpone the pre-lubrication as long as possible at the same time as it is desirable that the pre-lubrication is initiated and completed before the ICE has to be used in order to deliver torque.

According to one aspect of the disclosure, the method further comprises a functionality wherein the cranking operation is initiated, independently of estimated time of ICE torque delivery, when the hybrid electrical vehicle reaches a predetermined vehicle speed threshold. It is a desirable advantage with this embodiment of the disclosure that the cranking operation is completed, lubricating the ICE and make it ready for momentary torque delivery, without the driver noticing. As the vehicle speed increases, road noise, noise caused by vibrations, etc., will become more and more significant. The predetermined vehicle speed is chosen based on the speed at which the generated noise masks the noise caused by the cranking operation sufficiently. Masking the noise caused by the cranking operation will make the cranking operation less apparent for the driver, which otherwise might be a disturbing feature for the driver. Additionally, postponing the cranking operation to be executed at higher vehicle speeds, speeds at which the vehicle is subjected to vibrations, has the advantage that it also will hide the vibrations caused during cranking and make them less apparent for the driver. This will give the advantage of improved driveability.

The predetermined vehicle speed threshold can be different for different vehicle models etc., and there will also be a trade off between setting a higher vehicle speed threshold, wherein the general noise level will be more significant, hence better masking the noise from the cranking operation, versus setting a lower vehicle speed threshold, which contributes to lowering the risk of having a estimated time of ICE torque delivery that will initiate the cranking operation after the actual time of ICE torque delivery.

According to another aspect of the method for operating the pre-lubrication system for the ICE after vehicle start up, the engine control function uses a safety margin when calculating the estimated time of ICE torque delivery. Using the safety margin means that the time between vehicle start up and estimated time of ICE torque delivery, wherein the estimated time of ICE torque delivery is based on information from the torque/time information data set, is shortened. This has the advantage of that the risk of that the actual time of ICE torque delivery occurs before estimated time of ICE torque delivery is reduced. If this happens the lubrication of the ICE has not been executed in advance and the driver may experience a short lag while the lubrication is carried out, according to normal engine operation, before the vehicle responds with the requested torque. The safety margin is preferably calculated based on the information stored in the torque/time information data set. A bigger safety margin, hence greater shortening of the time for estimated time of ICE torque delivery, may for example be reasonable if the actual time of ICE torque delivery differs significantly between consecutive vehicle start ups. Using the torque/time information data set has the advantage that a more accurate assessment of suitable safety margin, and estimated time of ICE torque delivery, is possible based on the behaviour of the driver.

According to one aspect of the disclosure, the method further comprises a functionality controlling that one set of torque/time information data set may be associated with one specified driver, wherein every driver is characterized by a specific driver identifier. The specific driver identifier may be anything that can be used to distinguish one driver from all other possible drivers in a not confusable way. With the specific driver identifier, used together with a functionality in the EMS, preferably being part of the engine control function controlling the pre-lubrication system, it is possible to link a specific and unique set of torque/time information data set to a specific driver. This has the advantage that the vehicle will offer improved ownership feeling. When new torque/time information data is added to the previously stored torque/time information data, after the vehicle has been started and the pre-lubrication operation has been executed, this torque/time information data will be linked to the specific driver.

According to one advantageous embodiment of the method using specific driver identifier, the specific driver identifier is a personal device, wherein the specific driver identifier may for example be a personal car key. An advantage with this specific embodiment is that the driver needs no extra device except a personal car key.

According to another advantageous embodiment of the method using specific driver identifier, the specific driver identifier may be a specified set of car seat settings. Many drivers adjust the seat settings as they sit in the car, and this feature may be used in order to identify the driver. The advantage with this embodiment is that the driver needs no additional devices but will still be able to identify him-, or herself.

According to yet another advantageous embodiment of the method using specific driver identifier, the specific driver identifier may use Bluetooth in order to recognize the driver. The functionality used for driver identification may for example detect the driver's cellular phone, or any other personal device equipped with Bluetooth.

Specific car identifiers, used in order to calculate the estimated time of ICE torque delivery only on vehicle start ups executed by the identified driver, enabling an individual and more accurate estimation of the estimated time of ICE torque delivery, will not only reduce the risk of that actual time of ICE torque delivery occurs before estimated time of ICE torque delivery, but can also be used to achieve improved ownership feeling.

Finally, the disclosure also provides a device for operating the pre-lubrication system according to the method. Depending on the present example or embodiment of the method, the corresponding device may comprise different, but corresponding, functionalities.

In all of the examples of the method previously presented, the time at which all time intervals used according to the method; the estimated time of ICE torque delivery and the actual time of ICE torque delivery starts may be a time interval starting when the vehicle starts to move, the wheels have rotated one lap, the vehicle reaches a predetermined vehicle speed or other fixed timings in the spirit of the inventive concept, being before or at the latest at the estimated time of ICE torque delivery, instead of the time when starting the vehicle. Best timing to use is merely a matter of choice for a person skilled in the art.

Also, for the method the torque requested by the driver, etc., has been used as the variable controlling the EE and ICE operations, but also other variables, related to the torque such as the vehicle speed requested by the driver, the actual vehicle speed or any other driver input or measurable variable apparent for a person skilled in the art to be in the spirit of the invention, may be used and should be considered to be part of the inventive concept. The torque, vehicle speed, movement of the crankshaft, etc., are all interconnected variables and their individual relation to each other is well known for a person skilled in the art.

DETAILED DESCRIPTION

Figure 1:
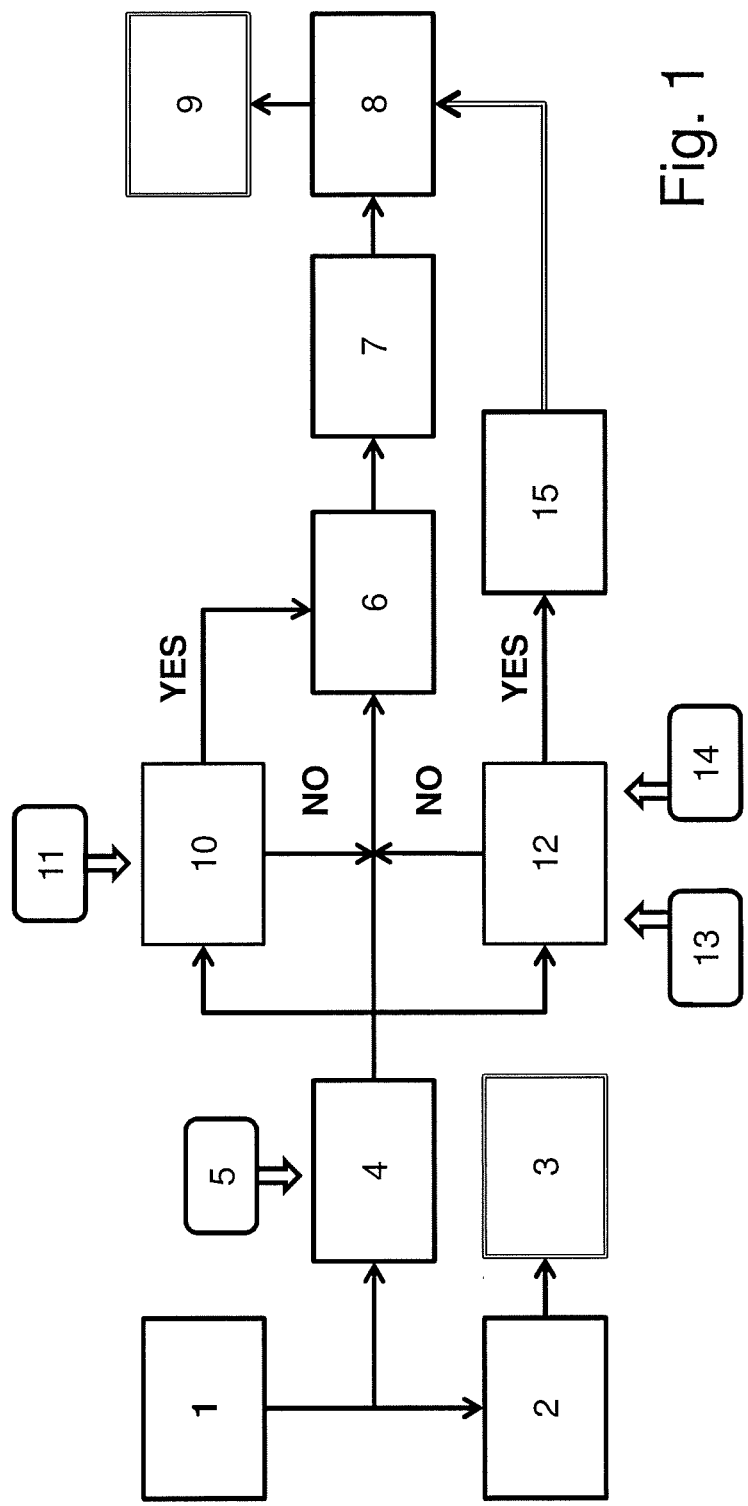
FIG. 1 shows a schematic block diagram over an example of the inventive method.

According to FIG. 1, which shows a schematic block diagram of an example of a method according to the present disclosure, the first step of the method is vehicle start up 1. At vehicle start up 1 the EE start up 2 is executed, wherein the EE is set to be EE ready for torque delivery 3. Further on, at vehicle start up 1 the estimated time of ICE torque delivery calculation 4 is executed with Input: Time/torque information data set 5, wherein the selected data in the time/torque information data set used as input to the calculation can be selected based on numerous criteria, for example being related to a specific period of time, a specific number of recent vehicle start ups, being selected by using an algorithm, etc. The first time the vehicle is started after manufacturing may preferably the estimated time of ICE torque delivery calculation 4 be based on an originally programmed value.

The estimated time of ICE torque delivery calculation 4 is used to calculate when the cranking operation 6 has to be initiated in order to be completed before a driver requests a predetermined torque threshold. After the cranking operation 6 has been executed, being the pre-lubrication of the engine wherein the oil circuit of the ICE is filled with oil, the ICE is set to ICE stand by 7 for ICE start up 8, wherein the pre-lubrication of the ICE ensures minimized wear at ICE start up 8. At ICE start up 8 the ICE is set to be ICE ready for torque delivery 9.

According to the method, an engine control function performs a monitoring operation; Status check: Predetermined vehicle speed threshold reached? 10, wherein Input: Predetermined vehicle speed threshold 11 is used. The Input: Predetermined vehicle speed threshold 11 is preferably chosen in order to be a vehicle speed where noise and vibrations generated from driving the vehicle masks the noise and vibrations generated by the cranking operation 6. When the engine control function detects that the vehicle speed threshold is reached (Status check: Predetermined vehicle speed threshold reached? 10=YES) it executes the cranking operation 6, wherein the oil circuit of the ICE is filled with oil, hence the ICE is set to ICE stand by 7 for ICE start up 8. At ICE start up 8, the ICE is set to be ICE ready for torque delivery 9.

According to general engine operation procedures, the control system of the vehicle and the EMS, comprising the engine control function, also monitor the driver's actual torque requests. If the driver requests torque equal to or higher than the predetermined torque threshold before the cranking operation 6 has been initiated and completed, either due to that the predetermined vehicle speed threshold has not been reached or due to that the calculated timing of ICE torque delivery has not been reached, the operation; Status check: Higher torque than the predetermined torque threshold requested? 12, using Input: Driver torque request 13 and Input: predetermined torque threshold 14, is executed with positive response (Status check: Higher torque than predetermined torque threshold requested? 12=YES) resulting in that a forced cranking operation 15 is automatically initiated in order to immediately execute ICE start up 8 where the ICE is set to be ICE ready for torque delivery 9. When being set to ICE ready for torque delivery 9, the driver's actual torque request can be met. The predetermined torque threshold might for some applications be set to be equal to the EE torque threshold.

Figure 2:
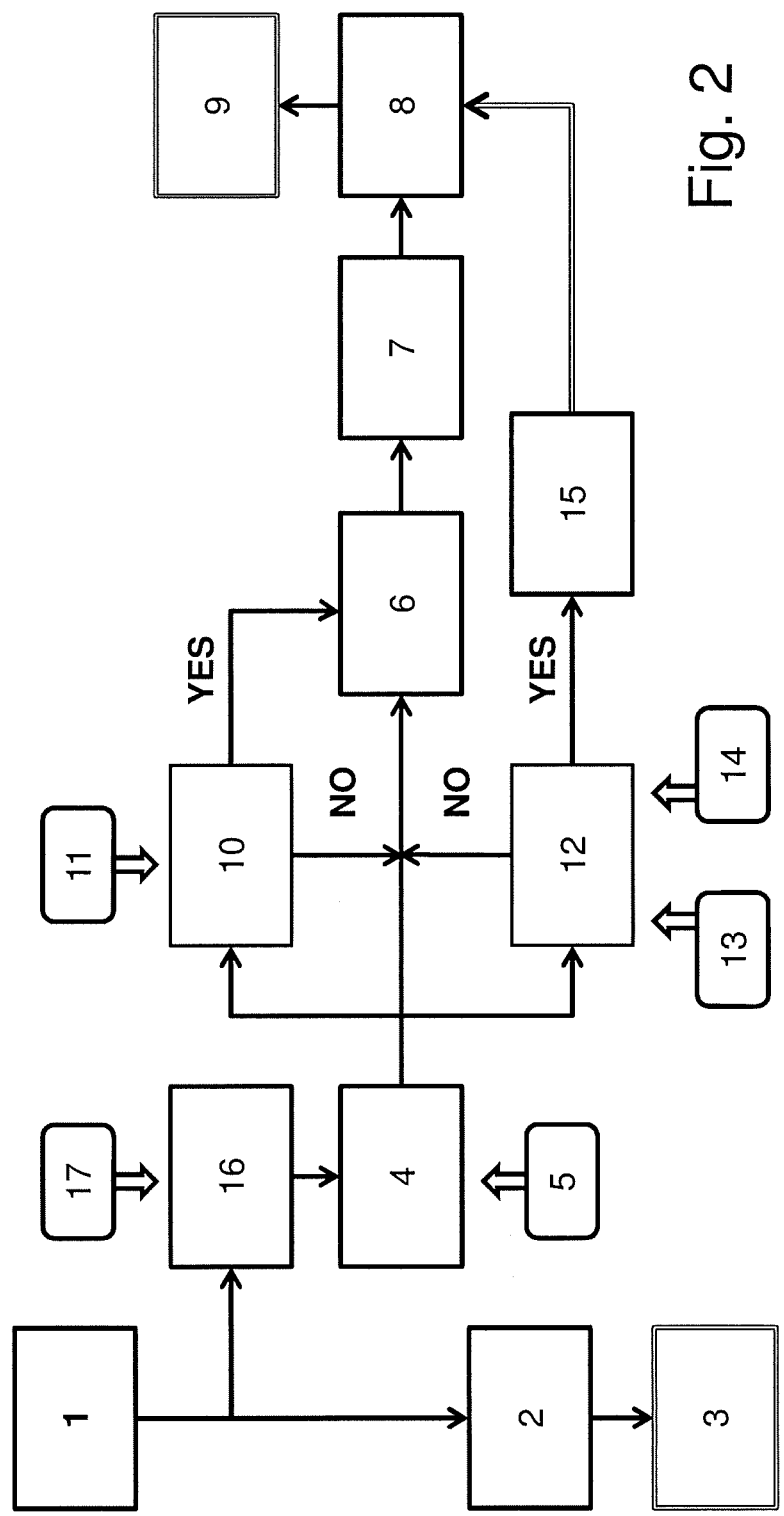
FIG. 2 shows another schematic block diagram over an example of the inventive method.

According to FIG. 2, which shows a schematic block diagram of another example of the method according to the present disclosure, the first step of the method is vehicle start up 1. At vehicle start up 1 the EE start up 2 is executed, wherein the EE is set to be EE ready for torque delivery 3. But according to the example of the method schematically shown in FIG. 2, an operation of Identification of specific driver identifier 16, using Input: Torque/time information data set associated with one specified driver 17, is executed before the estimated time of ICE torque delivery calculation 4 is executed. By using personalized torque/time information data set, the estimated time of ICE torque delivery calculation 4 can be based on vehicle start up and torque request information relevant for the specific driver giving a better estimated time for ICE torque delivery.

The estimated time of ICE torque delivery calculation 4 is used to calculate when the cranking operation 6 has to be initiated in order to be completed before a driver requests a predetermined torque threshold. After the cranking operation 6 has been executed, being the pre-lubrication of the engine wherein the oil circuit of the ICE is filled with oil, the ICE is set to ICE stand by 7 for ICE start up 8, wherein the pre-lubrication of the ICE ensures minimized wear at ICE start up 8. At ICE start up 8, the ICE is set to be ICE ready for torque delivery 9.

According to the method an engine control function performs a monitoring operation; Status check: Predetermined vehicle speed threshold reached? 10, wherein Input: Predetermined vehicle speed threshold 11 is used. The Input: Predetermined vehicle speed threshold 11 is preferably chosen in order to be a vehicle speed where noise and vibrations generated from driving the vehicle masks the noise and vibrations generated by the cranking operation 6. When the engine control function detects that the vehicle speed threshold is reached (Status check: Predetermined vehicle speed threshold reached? 10=YES) it executes the cranking operation 6, wherein the oil circuit of the ICE is filled with oil, hence the ICE is set to ICE stand by 7 for ICE start up 8. At ICE start up 8 the ICE is set to be ICE ready for torque delivery 9.

According to general engine operation procedures, the control system of the vehicle and the EMS, comprising the engine control function, also monitor the driver's actual torque requests. If the driver requests torque equal to or higher than a predetermined torque threshold before the cranking operation 6 has been initiated and completed, either due to that the predetermined vehicle speed not has been reached or due to that the calculated timing of ICE torque delivery has not been reached, the operation; Status check: Higher torque than the predetermined torque threshold requested? 12, using Input: Driver torque request 13 and Input: predetermined torque threshold 14, is executed with positive response (Status check: Higher torque than the predetermined torque threshold requested? 12=YES), resulting in that a forced cranking operation 15 is automatically initiated in order to immediately execute ICE start up 8 where the ICE is set to be ICE ready for torque delivery 9. When being set to ICE ready for torque delivery 9 the driver's actual torque request can be met. The predetermined torque threshold might for some applications be set to be equal to the EE torque threshold.

Figure 3:
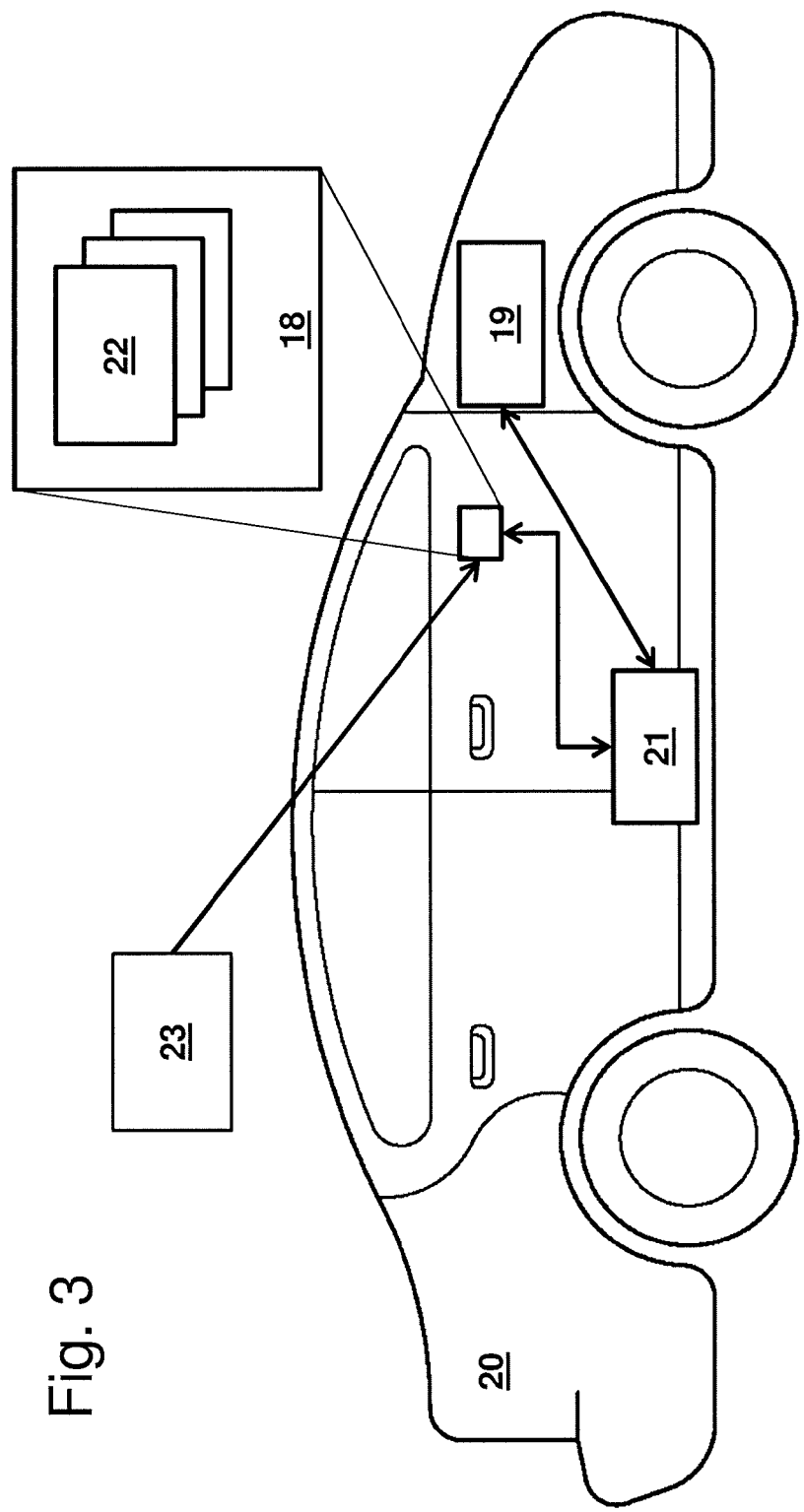
FIG. 3 shows a schematic view over how important devices are interconnected.

FIG. 3 shows a schematic view of a hybrid electrical vehicle 20. The vehicle comprises an Internal Combustion Engine (ICE) 19 and an Electric Engine (EE) 21. The ICE 19 and the EE 21 are interconnected to each other. The mechanical connection between the ICE 19 and the EE 21 is arranged according to any of the existing hybrid concepts, which are all considered to be well known for a person skilled in the art. The ICE 19 is connected to a device for operating a pre-lubrication system 18, wherein the device for operating a pre-lubrication system 18 comprises an engine control function for controlling the ICE, monitoring the torque requested by the driver and storing information 22. During normal vehicle operation, the engine control function 22 both sends and receives information, according to what is stated in the detailed description, to and from the ICE 19 in order to control the pre-lubrication operation, the cranking operation etc. Finally, FIG. 3 shows a specific driver identifier 23, used to identify which individual driver that is sitting in or are adjacent the hybrid electrical vehicle 20, probably in order to drive it. The specific driver identifier 23, identifying present driver, interacts with the device for operating a pre-lubrication system 18 and the engine control function 22. This interaction can be performed in many different ways such as by wireless communication (Bluetooth, etc.), by detecting that a person specific device is used or by detecting that a person specific setting is used. Based on the identified driver's individual set of data in the torque/time information data set will the device for operating a pre-lubrication system 18 and the engine control function 22 use a specific set of data from the torque/time information data set to calculate the estimated time of ICE 19 torque delivery, safety margin etc., facilitating more accurate estimation of the estimated time of ICE 19 torque delivery and improved ownership feeling.

Those skilled in the art will appreciate that the vehicle control system, the EMS and/or the engine control function described above may refer to any combination of analog and/or digital circuitry, which may include one or more microprocessors, including memory, having stored software, such as one or more software modules, and/or firmware that when executed control and/or perform one or more of the functions and/or operations described herein. Such a control system, EMS and/or engine control function, including any processors and/or other digital hardware or circuitry, may be included in an ASIC (Application-Specific Integrated Circuit) or may be distributed among several separate components, whether individually packaged or assembled into a SoC (System-on-a-Chip).

It should be added that the descriptions of the examples according to the figures are for clarifying purposes only and should not be interpreted as limiting the invention exclusively of these examples/aspects/embodiments. As will be realized, the invention is capable of modification in various obvious respects, all without departing from the scope of the appended claims. Accordingly, the drawings and the description thereto are to be regarded as illustrative in nature, and not restrictive. Additionally, the features of various implementing embodiments may be combined to form further embodiments of the invention.

What is claimed is:

1. A method for operating a pre-lubrication system for an internal combustion engine (ICE) of a hybrid electrical vehicle after vehicle start up, wherein the hybrid electrical vehicle comprises an electric engine (EE) and the ICE, wherein the EE is turned on at vehicle start up and the ICE is turned on at vehicle start up or after a period of time after vehicle start up at least when the driver requests, or is presumed to request, torque equal to or higher than a predetermined torque threshold, wherein the ICE is used together with the EE or instead of the EE, and wherein the pre-lubrication system comprises an engine control function for controlling the ICE, monitoring the torque requested by the driver and storing information regarding when the driver requests torque equal to or higher than the predetermined torque threshold as torque/time information data set, the method comprising the following operations, controlled and initiated by the engine control function:

after vehicle start up and EE start up, controlling the stored torque/time information data set;

based on selected data from the stored torque/time information data set, estimating when the driver will request the predetermined torque threshold, being an estimated time of ICE torque delivery;

based on the estimated time of ICE torque delivery, initiating a cranking operation of the engine in order to build up oil pressure in the ICE and filling an engine oil circuit with oil, wherein the cranking operation in order to build up oil pressure in the ICE and filling an engine oil circuit with oil is initiated and completed before the estimated time of ICE torque delivery; and monitoring of when the driver requests at least the predetermined torque threshold, being an actual time of ICE torque delivery, and storing the actual time of ICE torque delivery together with the torque/time information data set.

2. The method according to claim 1 wherein the predetermined torque threshold is a maximum torque delivered by the EE.

3. The method according to claim 1 wherein the predetermined torque threshold is equal to, or lower than, a maximum torque delivered by the EE.

4. The method according to claim 1 wherein the cranking operation is initiated, independently of estimated time of ICE torque delivery, when the hybrid electrical vehicle reaches a predetermined vehicle speed threshold.

5. The method according to claim 1 wherein the engine control function uses a safety margin when calculating the estimated time of ICE torque delivery, and wherein the safety margin is calculated based on the torque/time information data set.

6. The method according to claim 1 wherein one set of the torque/time information data set is associated with one specified driver, and each of multiple drivers is associated with a specific driver identifier.

7. The method according to claim 6 wherein each specific driver identifier is a personal device.

8. The method according to claim 7 wherein each specific driver identifier is a personal car key.

9. The method according to claim 6 wherein each specific driver identifier comprises a specified set of car seat settings.

10. The method according to claim 1 wherein the engine control function comprises a software module.

11. A device for operating a pre-lubrication system for an internal combustion engine (ICE) of a hybrid electrical vehicle after vehicle start up, wherein the hybrid electrical vehicle comprises an electric engine (EE) and the ICE, wherein the EE is adapted to be turned on at vehicle start up and the ICE is adapted to be turned on at vehicle start up or after a period of time after vehicle start up at least when the driver requests, or is presumed to request, torque equal to or higher than a predetermined torque threshold, and wherein the ICE is usable together with the EE or instead of the EE, the device for operating the pre-lubrication system comprising:
an engine control function for controlling the ICE, monitoring the torque requested by the driver and storing information regarding when the driver requests torque equal to or higher than the predetermined torque threshold as torque/time information data set, and wherein the device for operating the pre-lubrication system is configured to perform the following operations, which are controllable and initiatable by the engine control function:
after vehicle start up and EE start up, control the stored torque/time information data set;
based on selected data from the stored torque/time information data set, estimate when the driver will request the predetermined torque threshold, being an estimated time of ICE torque delivery;
based on the estimated time of ICE torque delivery, initiate a cranking operation of the engine in order to build up oil pressure in the ICE and fill an engine oil circuit with oil, such that the cranking operation is initiated and completed before the estimated time of ICE torque delivery; and
monitor when the driver requests at least the predetermined torque threshold, being an actual time of ICE torque delivery, and store the actual time of ICE torque delivery together with the torque/time information data set.

12. The device for operating a pre-lubrication system according to claim 11 wherein the predetermined torque threshold is a maximum torque deliverable by the EE.

13. The device for operating a pre-lubrication system according to claim 11 wherein the predetermined torque threshold is equal to, or lower than, a maximum torque deliverable by the EE.

14. The device for operating a pre-lubrication system according to claim 11 wherein the engine control function is configured to initiate the cranking operation, independently of estimated time of ICE torque delivery, when the hybrid electrical vehicle reaches a predetermined vehicle speed threshold.

15. The device for operating a pre-lubrication system according to claim 11 wherein one set of torque/time information data set is associated with one specified driver, wherein each of multiple drivers is associated with a specific driver identifier.

16. The device for operating a pre-lubrication system according to claim 15 wherein each specific driver identifier is a personal device.

17. The device for operating a pre-lubrication system according to claim 16 wherein each specific driver identifier is a personal car key.

18. The device for operating a pre-lubrication system according to claim 15 wherein each specific driver identifier comprises a specified set of car seat settings.

19. The device for operating a pre-lubrication system according to claim 11 wherein the engine control function comprises a software module.

20. A method for operating a pre-lubrication system for an internal combustion engine (ICE) of a hybrid electrical vehicle after vehicle start up, wherein the hybrid electrical vehicle also comprises an electric engine (EE), wherein the EE is turned on at vehicle start up and the ICE is turned on at vehicle start up or after a period of time after vehicle start up at least when the driver requests, or is presumed to request, torque equal to or higher than a predetermined torque threshold, wherein the ICE is used together with the EE or instead of the EE, and wherein the pre-lubrication system is configured to control the ICE, monitor the torque requested by the driver and store information regarding when the driver requests torque equal to or higher than the predetermined torque threshold as torque/time information data set, the method comprising the following:
after vehicle start up and EE start up, controlling the stored torque/time information data set;
based on selected data from the stored torque/time information data set, estimating when the driver will request the predetermined torque threshold, being an estimated time of ICE torque delivery;
based on the estimated time of ICE torque delivery, initiating a cranking operation of the engine in order to build up oil pressure in the ICE and filling an engine oil circuit with oil, wherein the cranking operation in order to build up oil pressure in the ICE and filling an engine oil circuit with oil is initiated and completed before the estimated time of ICE torque delivery; and
monitoring when the driver requests at least the predetermined torque threshold, being an actual time of ICE torque delivery, and storing the actual time of ICE torque delivery together with the torque/time information data set.

* * * * *